US011912560B2

(12) United States Patent
Bhutani et al.

(10) Patent No.: US 11,912,560 B2
(45) Date of Patent: Feb. 27, 2024

(54) BEVERAGE DISPENSER SYSTEMS AND METHODS

(71) Applicant: PepsiCo, Inc., Purchase, NY (US)

(72) Inventors: Gurmeet Singh Bhutani, Gurgaon (IN); Vipin Arora, Delhi (IN); Rahul Sadashiv Kamble, Faridabad (IN); Rohit Phanda, New Delhi (IN); Somchat Tipnoysanga, Kanchanaburi (TH)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/816,482

(22) Filed: Aug. 1, 2022

(65) Prior Publication Data

US 2022/0363531 A1 Nov. 17, 2022

Related U.S. Application Data

(63) Continuation of application No. 16/176,140, filed on Oct. 31, 2018, now Pat. No. 11,434,124.

(30) Foreign Application Priority Data

Nov. 1, 2017 (IN) ............................ 201741038893

(51) Int. Cl.
*B67D 1/08* (2006.01)
*B67D 3/04* (2006.01)
*B67D 3/00* (2006.01)

(52) U.S. Cl.
CPC ............. *B67D 1/0889* (2013.01); *B67D 1/08* (2013.01); *B67D 3/0035* (2013.01); *B67D 3/0083* (2013.01); *B67D 3/048* (2013.01)

(58) Field of Classification Search
CPC ...... B67D 1/0889; B67D 1/08; B67D 3/0035; B67D 3/048; B67D 3/0083; B67D 3/0029; F25D 2331/809
See application file for complete search history.

(56) References Cited

U.S. PATENT DOCUMENTS

| | | | | |
|---|---|---|---|---|
| 1,017,756 A | | 2/1912 | Head | |
| 2,708,056 A | * | 5/1955 | Reid | B67D 3/00 222/542 |
| 3,376,582 A | | 4/1968 | Samuels | |
| 4,664,297 A | | 5/1987 | Giovinazzi | |
| 4,715,516 A | | 12/1987 | Salvail | |

(Continued)

FOREIGN PATENT DOCUMENTS

| | | |
|---|---|---|
| JP | 2009-120221 A | 6/2009 |
| JP | 2009-202903 A | 9/2009 |

*Primary Examiner* — Vishal Pancholi
*Assistant Examiner* — Robert K Nichols, II
(74) *Attorney, Agent, or Firm* — Sterne, Kessler, Goldstein & Fox P.L.L.C.

(57) ABSTRACT

A beverage dispensing system is provided, including a main body having a base portion, and a cradle portion configured to support a beverage container including a beverage to be dispensed. The cradle portion may include an elongated cavity, and a shoulder configured to receive an inverted beverage container. The beverage dispensing system may further include an adaptor, and a self-venting tap, and the adaptor is configured to couple a beverage container to the self-venting tap, such that a beverage may be dispensed through the tap.

9 Claims, 8 Drawing Sheets

(56) References Cited

U.S. PATENT DOCUMENTS

| | | | | | |
|---|---|---|---|---|---|
| 4,911,334 | A | * | 3/1990 | Kedzierski | B67D 3/00 222/484 |
| 4,932,561 | A | * | 6/1990 | Boxall | B67D 1/0858 222/638 |
| 5,024,353 | A | | 6/1991 | Horne | |
| 5,031,676 | A | | 7/1991 | Ulm | |
| 5,377,878 | A | | 1/1995 | Rainey et al. | |
| 5,405,058 | A | * | 4/1995 | Kalis | B67D 3/043 222/481.5 |
| 5,947,339 | A | | 9/1999 | Boshears et al. | |
| 6,527,145 | B1 | | 3/2003 | Bennett, Jr. | |
| 6,540,111 | B2 | | 4/2003 | Sunnarborg | |
| 6,820,772 | B1 | | 11/2004 | Bennett, Jr. | |
| 6,892,903 | B1 | | 5/2005 | Bartolotta | |
| 7,494,029 | B2 | | 2/2009 | Orita | |
| 8,336,743 | B2 | | 12/2012 | Bellmore | |
| 2014/0216595 | A1 | | 8/2014 | Raad | |
| 2017/0225937 | A1 | | 8/2017 | Gallagher | |

* cited by examiner

BEVERAGE DISPENSER SYSTEMS AND METHODS

FIELD

The described embodiments relate generally to a beverage dispenser. In particular, embodiments relate to adaptor and base system and method utilizing a self-venting tap and air tube for use with a "break-and-pour" system.

BACKGROUND

Various systems and methods for beverage dispensing systems may be used. Beverage dispensing units have become a popular way for food and beverage establishments to create or dispense on-site fountain beverages. Typically, these units include several bag-in-box containers that each contains syrup, a liquid source that dispenses a liquid, a mixing unit, and a dispensing unit. Syrup is pumped from the bag-in-box container into the mixing unit where it is mixed with liquid to form a beverage that is then dispensed through the dispensing unit. Typically, a pump causes the syrup to be released from the bag-in-box container into the mixing unit.

However, in developing and emerging markets, proprietors of markets or road-side stands may not have access to reliable electricity, running water, or refrigeration. In these markets, saleable bottles of beverages (e.g., PET bottles of soft drink, for example), may be bought by owners of such shops and resold to customers as poured into a cup or glass. In this way, the shop keeper is still able to provide beverages, and the original beverage producer is still gaining sales of saleable units. However, current systems, including manual opening and pouring suffer from slow pouring time, loss of carbonation in carbonated beverages, difficult sanitation in open systems, and other issues described herein. Improved systems and methods are required to overcome these and other issues with prior systems.

SUMMARY

Some embodiments are directed to a beverage dispensing system, including a main body, which may include a base portion, and a cradle portion configured to support a beverage container including a beverage to be dispensed. The cradle portion may include an elongated cavity, and a shoulder configured to receive an inverted beverage container. The beverage dispensing system may further include an adaptor, and a self-venting tap, wherein the adaptor is configured to couple a beverage container to the self-venting tap, such that a beverage may be dispensed through the tap.

In some embodiments, the cradle portion is configured to support a beverage container at an inclined angle. In some embodiments, the inclined angle is between about 20 degrees and about 60 degrees with respect to a vertical axis. In some embodiments, the inclined angle may be between about 0 degrees and about 60 degrees. In some embodiments, the inclined angle is between about 20 degrees and about 40 degrees with respect to a vertical axis. In some embodiments, the inclined angle is between about 10 and about 30 degrees with respect to a vertical axis. In some embodiments, the inclined angle is about 30 degrees with respect to a vertical axis. In some embodiments, the inclined angle is about 20 degrees with respect to a vertical axis. In some embodiments, the inclined angle is about 10 degrees with respect to a vertical axis. In some embodiments, the base portion and cradle portion are integrally formed as a single piece. In some embodiments, the cradle portion further includes a slot, and the adaptor further includes a tab such that the tab and slot engage to support the beverage container within the cradle. In some embodiments, the system includes an air tube configured to be coupled to the self-venting tap such that it may be inserted into a beverage container above a carbonated liquid level of a beverage to be dispensed, such that carbonation loss is reduced. In some embodiments, the beverage container is a bottle. In some embodiments, the adaptor may be coupled to an opening of a beverage container in an upright position in a first loading configuration, and inverted to be positioned in the cradle portion in a second beverage dispensing configuration, such that the opening of the beverage container in the second beverage dispensing configuration is inverted.

In some embodiments, the system includes a second cradle portion configured to support a second beverage container including a second beverage to be dispensed, a second adaptor, and a second self-venting tap, wherein the second adaptor is configured to couple the second beverage container to the second self-venting tap, such that a second beverage may be dispensed through the second tap. In some embodiments, the system includes a bottle seal configured to seal the adaptor to the beverage container.

In some embodiments, the adaptor includes an inlet portion to be coupled to the beverage container, and an outlet portion to be coupled to the tap, wherein the inlet portion and outlet portions are angled with respect to each other such that the adaptor is configured as a fluid elbow.

Some embodiments are directed to a one-piece main body for a beverage dispensing system, including a base portion, and a cradle portion configured to support a beverage container including a beverage to be dispensed, wherein the base portion and cradle portion are formed such that a cavity is formed beneath the main body such that multiple one-piece main bodies may be stacked together.

In some embodiments, the main body includes a peripheral lip around the distal end of the base portion configured to couple with a support pad, thereby closing the cavity beneath the main body. In some embodiments, the main body includes a peripheral lip around the distal end of the base portion configured to couple with a leveling support pad such that the main body may balance on relatively uneven surfaces.

In some embodiments, the cradle portion includes an engagement member configured to engage an adaptor connected to a beverage container such that the adaptor and beverage container may be secured in the cradle portion. In some embodiments, the cradle portion is configured to support a beverage container coupled to an adaptor at an inclined angle, such that a portion of the beverage container contacts an inner surface of the cradle portion In some embodiments, the inclined angle is between about 20 degrees and about 60 degrees with respect to a vertical axis. In some embodiments, the inclined angle is between about 0 degrees and about 60 degrees. In some embodiments, the inclined angle is between about 20 degrees and about 40 degrees with respect to a vertical axis. In some embodiments, the inclined angle is between about 10 and about 30 degrees with respect to a vertical axis. In some embodiments, the inclined angle is about 30 degrees with respect to a vertical axis. In some embodiments, the inclined angle is about 20 degrees with respect to a vertical axis. In some embodiments, the inclined angle is about 10 degrees with respect to a vertical axis.

In some embodiments, the main body includes a branding surface positioned on the base portion. In some embodiments, the base portion and cradle portion are integrally formed as a single piece.

Some embodiments are directed to a method for dispensing a beverage, including providing a beverage bottle, coupling the opening of the bottle to an adaptor, inverting the bottle and placing it in a cradle portion of a main body whereby the adaptor and cradle portion are coupled at an engagement portion, the cradle portion including an elongated cavity and a shoulder portion configured to receive the inverted bottle; and dispensing the beverage. In some embodiments, the method includes coupling the adaptor to a self-venting tap, coupling the self-venting tap to an air tube, and positioning the air-tube within the open beverage bottle such that a distal end of the tube is above a liquid level in the beverage bottle.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
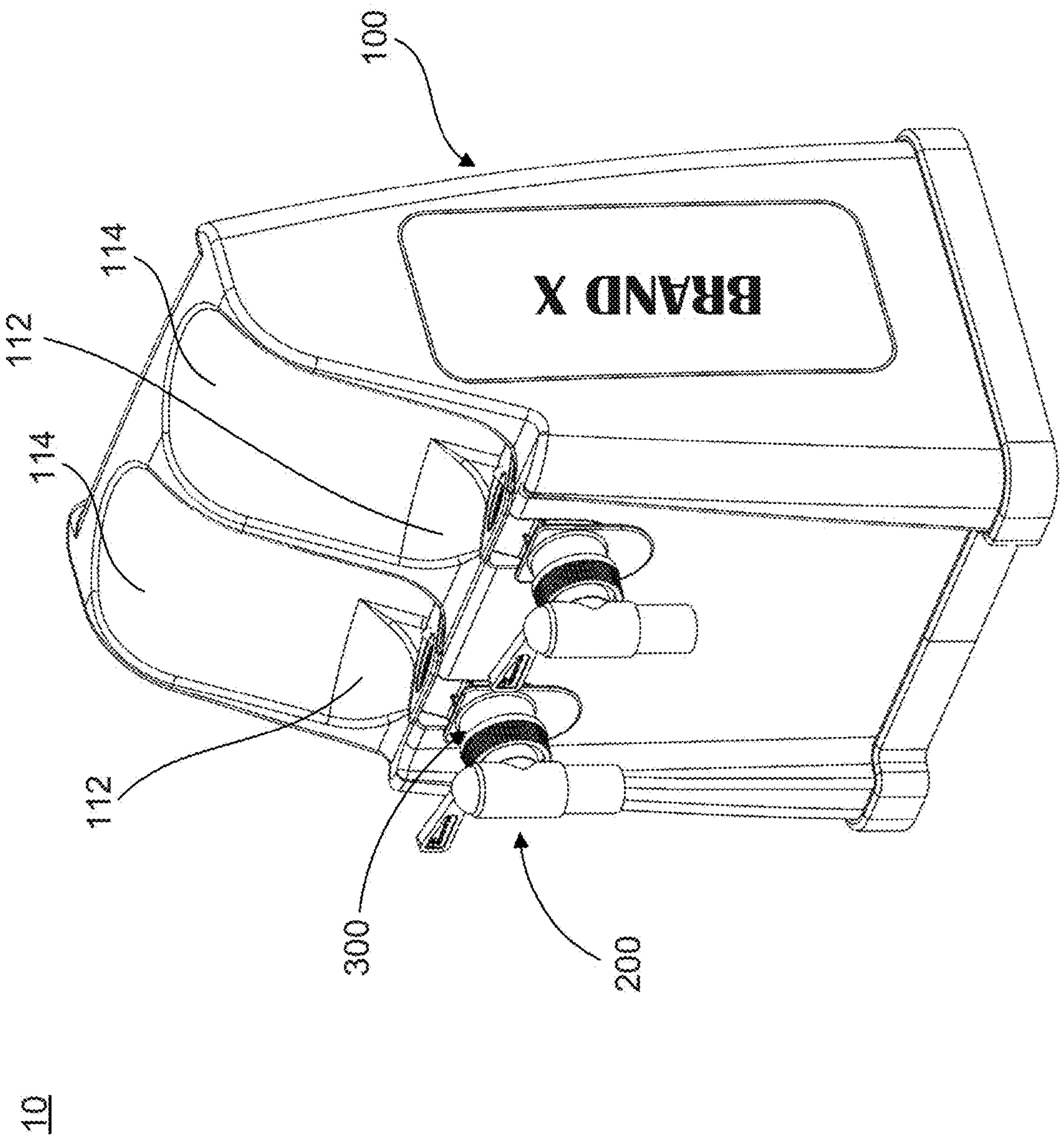
FIG. 1 shows an assembly perspective view of a beverage dispensing system according to an embodiment.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As discussed above, beverage dispensing units have become a popular way for food and beverage establishments to create or dispense on-site fountain beverages. Typically, these units include several bag-in-box containers that each contains syrup, a liquid source that dispenses a liquid, a mixing unit, and a dispensing unit. Syrup is pumped from the bag-in-box container into the mixing unit where it is mixed with liquid to form a beverage that is then dispensed through the dispensing unit. Typically, a pump causes the syrup to be released from the bag-in-box container into the mixing unit.

However, in developing nations and pyramid markets, beverages may be poured and served to customers through higher capacity packaged bottles (e.g., 1.25 to 2.25 liter bottles). This process may be referred to as "break-and-pour". Previous methods and systems include, manual breaking and pouring by tilting the bottle by a server, pouring through a particular tap, or pressurizing a bottle. However, dispensing in these ways have problems associated with them. For example, manual pouring is inefficient and cumbersome for the operator/shopkeeper. Further, if the beverage is a carbonated beverage, these methods tend to decrease the carbonation in them, as air comes in contact with the beverage allows the beverage to lose carbonation. Non-smooth pouring of a carbonated beverage further releases carbonation, and foam may be formed in the glass into which it is poured.

In systems where a bottle is inverted vertically, in these dispensers loss of carbonation is also an issue, as air rushes through the beverage to displace the beverage. While the air is rushing through the beverage, it loses its carbonation and hence consumers complain a flat drink. Also, a fixed, vertically inverted bottle dispenser has its own challenges of connecting the bottle without spillage. Other systems may be overly complex, leading to difficulty in cleaning the dispenser valve regularly, which is a chore for the operator/shopkeeper. Previous systems and methods do not allow for fast service, leading to an operator having to squeeze the bottle during dispensing for fast pouring, and even then the bottle does not empty completely in many cases.

What is needed is an improved break-and-pour beverage dispensing system, improving upon prior systems, such that an affordable, simple, efficient, fast-pouring, convenient, and ergonomic dispenser is available in developing markets. Embodiments of the systems described herein solve one or more of these problems, and decrease spillage, allow for no pressure applications, and improved carbonation retention. The systems disclosed generally do not require any power to function, or external carbon dioxide source. Moreover, do-it-yourself installation and no training being required is achieved through the disclosed systems.

In some embodiments, the beverage container may be a single serve package and can be provided to the consumer from a store attendant. In other embodiments, the beverage may be dispensed to the consumer through a refrigerated system. In some embodiments, the system may be refrigerated and include an integrated point-of-sale ("POS") payment system that would dispense the beverage requiring very little to no interaction from a store attendant, aside from re loading a beverage container and periodic cleaning of the valves.

These and other embodiments are discussed below with reference to the figures. However, those skilled in the art will readily appreciate that the detailed description given herein with respect to these figures is for explanatory purposes only and should not be construed as limiting.

Figure 2:
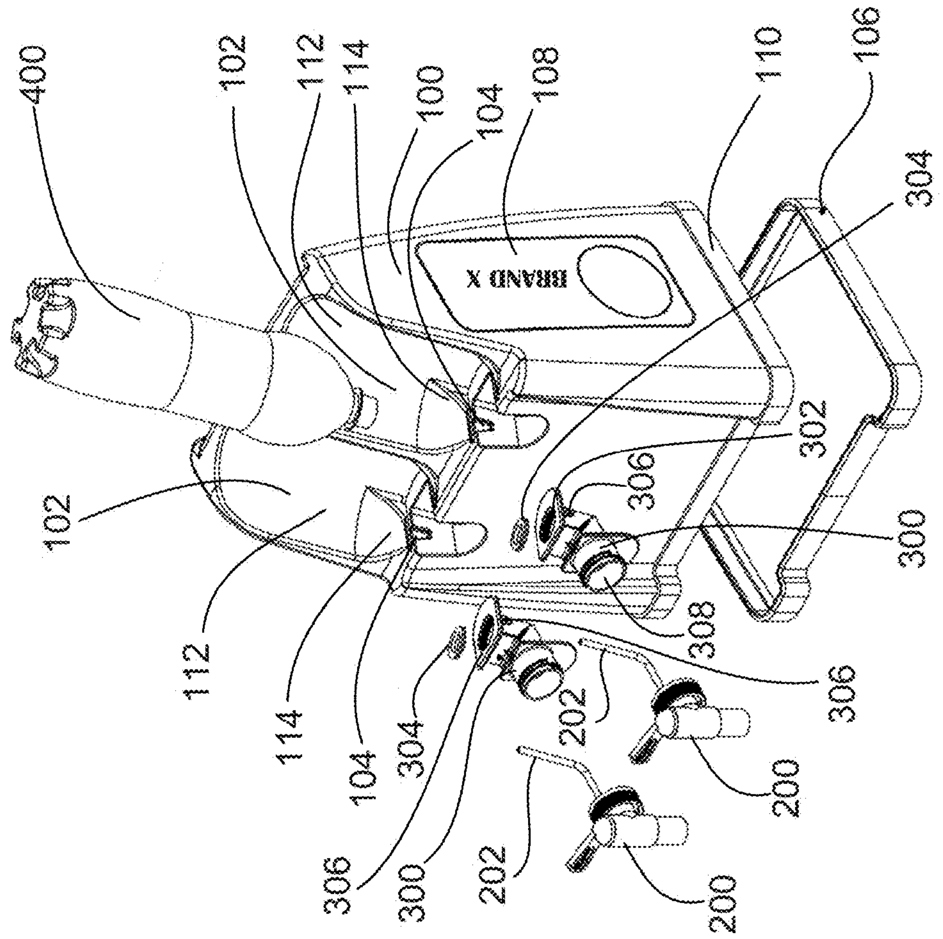
FIG. 2 shows an exploded assembly perspective view of a the beverage dispensing system shown in FIG. 1, including a beverage container.

Referring to FIGS. 1 and 2, beverage dispensing system 10 may include a main body 100, which may include a base portion 108, and a cradle portion 102 configured to support a beverage container 400 (such as a bottle) including a beverage to be dispensed. The cradle portion 102 may include an elongated cavity 114, and a shoulder 112 configured to receive an inverted beverage container 400 (e.g., beverage bottle). Main body 100 may be configured as a plastic body, which advantageously allows for a portable and rugged installation, for example in use at roadside stands in developing and emerging markets.

In some embodiments, beverage dispensing system 10 includes an adaptor 300, and a self-venting tap 200. As shown, adaptor 300 is configured to couple a beverage container 400 to self-venting tap 200, such that a beverage may be dispensed through the tap 200.

In some embodiments, cradle portion 102 is configured to support a beverage container 400 at an inclined angle. In some embodiments, the inclined angle is between about 20 degrees and about 60 degrees with respect to a vertical axis. In some embodiments, the inclined angle is between about 0 degrees and about 60 degrees. In some embodiments, the inclined angle is between about 20 degrees and about 40 degrees with respect to a vertical axis. In some embodiments, the inclined angle is between about 10 and about 30 degrees with respect to a vertical axis. In some embodiments, the inclined angle is about 30 degrees with respect to a vertical axis. In some embodiments, the inclined angle is about 20 degrees with respect to a vertical axis. In some embodiments, the inclined angle is about 10 degrees with respect to a vertical axis. The inclination of the angle provides for good flow through the dispenser 10, and also improves ergonomic operation by the operator in that the beverage container 400 does not need to be fully vertically inverted. Additionally, an angled beverage dispensing angle decreases vertical footprint of the system 10. In some embodiments, base portion 108 and cradle portion 102 are integrally formed as a single piece (e.g., molded from a single form, or stamped from a single form).

Figure 8:
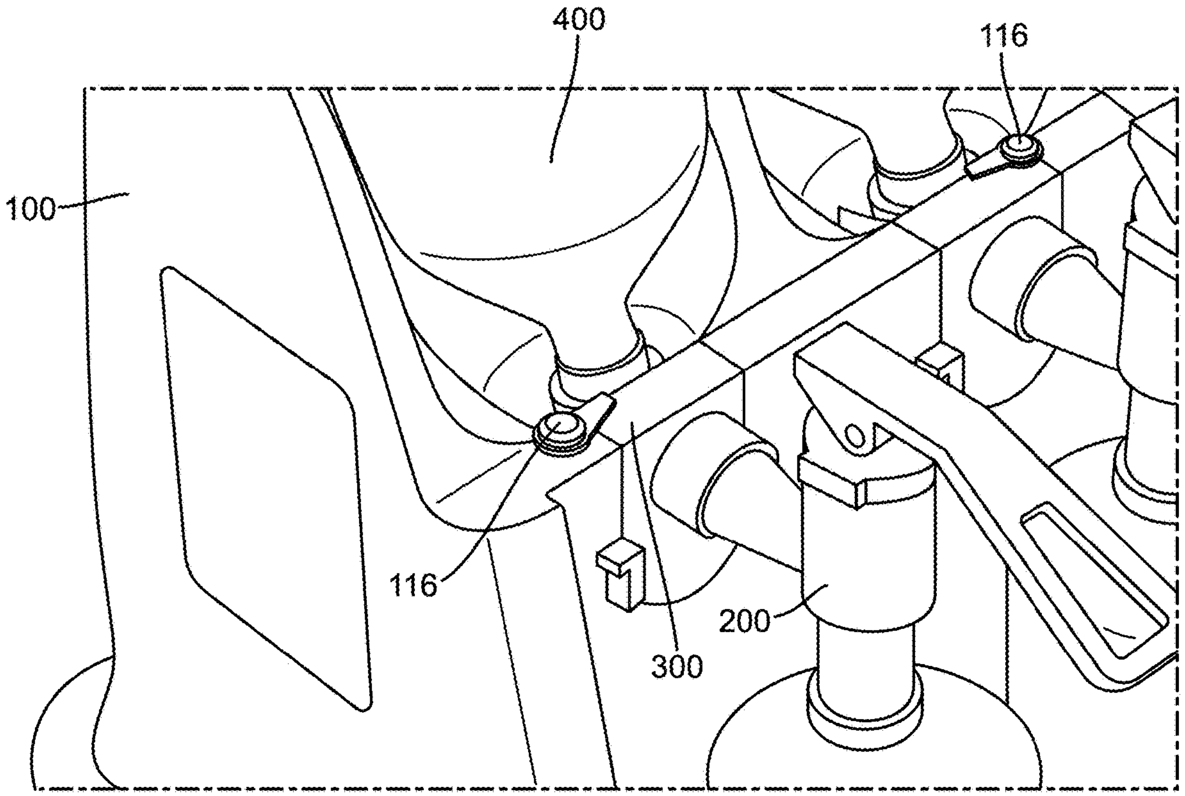
FIG. 8 shows a detail view of features of a beverage dispensing system according to an embodiment.

In some embodiments, cradle portion 108 further includes a slot 104, and adaptor 300 further includes a tab 302 such that tab 302 and slot 104 engage to support the beverage container 400 within the cradle 108. In other embodiments, other engagement members, such as clips or snap-fits may be provided to support and align adaptor 300 within main body 100 such that a beverage may be dispensed from beverage container 400. In some embodiments, a locking feature 116 is disposed near slot 104. As best shown in FIG. 8, locking feature 116 is designed to prevent adaptor 300, and corresponding beverage container 400, from being removed from cradle 108 once attached. In some embodiments, locking feature 116 may comprise a lever configured to rotate on top of and obstruct the movement of adaptor 300 after it has been installed.

In some embodiments, the system includes an air tube 202 configured to be coupled to self-venting tap 200 such that it may be inserted into a beverage container 400 above a carbonated liquid level of a beverage to be dispensed, such that carbonation loss is reduced. Advantageously, in this respect, the self-venting action of tap 200 interacts with air tube 202 to bypass the air from mixing with the liquid in the beverage container 400. Moreover, the air tube 202 allows for the pressure above the liquid level to normalize such that a fast flow of liquid through tap 200 is possible, and the beverage does not "glug" when poured, leading to further carbonation loss in carbonated beverages. In some embodiments, the self-venting tap 200 allows the air internal to the beverage container 400 be released before any beverage is released from self-venting tap 200. In this regard, relatively higher pressure carbon dioxide internal to a beverage container 400 containing a carbonated beverage is purged, resulting in better laminar flow of the beverage from self-venting tap 400. This reduces undesirable foaming during dispensing into a cup, especially in the case of carbonated beverages.

In some embodiments, the beverage container is a bottle. In some embodiments, the adaptor 300 may be coupled to an opening of a beverage container 400 in an upright position in a first loading configuration, and inverted to be positioned in the cradle portion 102 in a second beverage dispensing configuration, such that the opening of the beverage container in the second beverage dispensing configuration is inverted, e.g., at an angle off vertical.

In some embodiments, beverage container 400 may be a saleable bottle, e.g., a PET bottle of a soft drink. In some embodiments, an operator may remove a cap on beverage container 400, in order to couple beverage container 400 to adaptor 300. In some embodiments, system 10 may instead puncture beverage container, for example through a puncturing device within adaptor 300.

As shown in FIG. 2, for example, in some embodiments, the system includes a second cradle portion 102 configured to support a second beverage container 400 including a second beverage to be dispensed. In some embodiments, system 10 includes second adaptor 300, with a corresponding second self-venting tap 200, mirroring the first dispensing components mentioned above. This may allow for multiple different beverages to be dispensed without changing the configuration of the system 10. In some embodiments, the same beverage may be configured to be dispensed from within cradle portion 102, or different beverages may be configured to be dispensed. In some embodiments, multiple taps 200 and adaptors 300 may be connected to beverage containers 400 behind a counter, for example, and when a customer wishes to have a particular beverage, the beverage container coupled to the tap 200 via adaptor 300 may be obtained, placed inverted at an angle within cradle portion 102, and dispensed into a cup or glass.

Figure 3B:
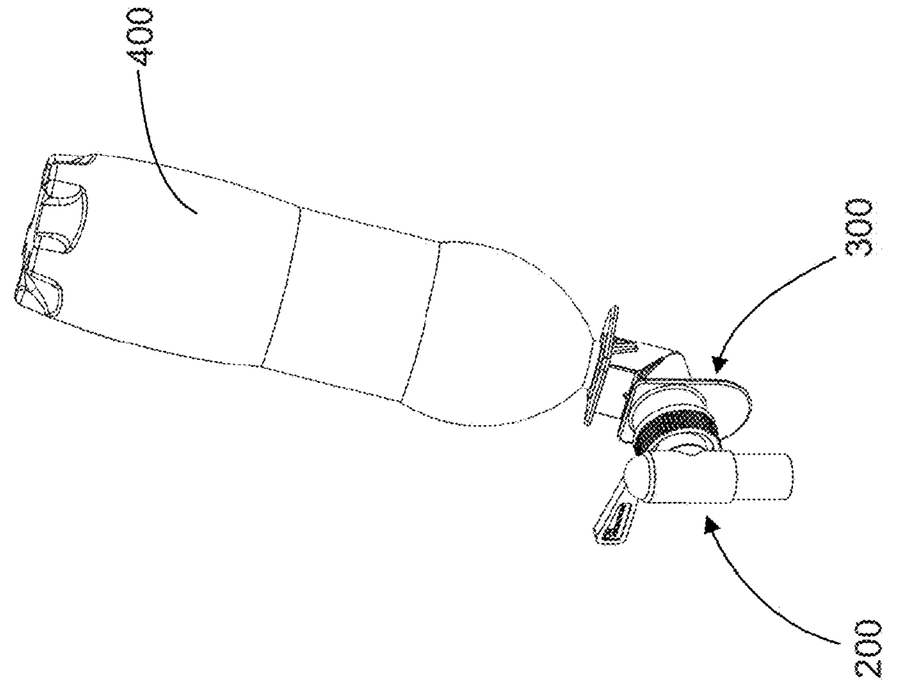
FIG. 3B shows an assembled view of the adaptor, valve, and beverage container shown in FIG. 3A.
Figure 3A:
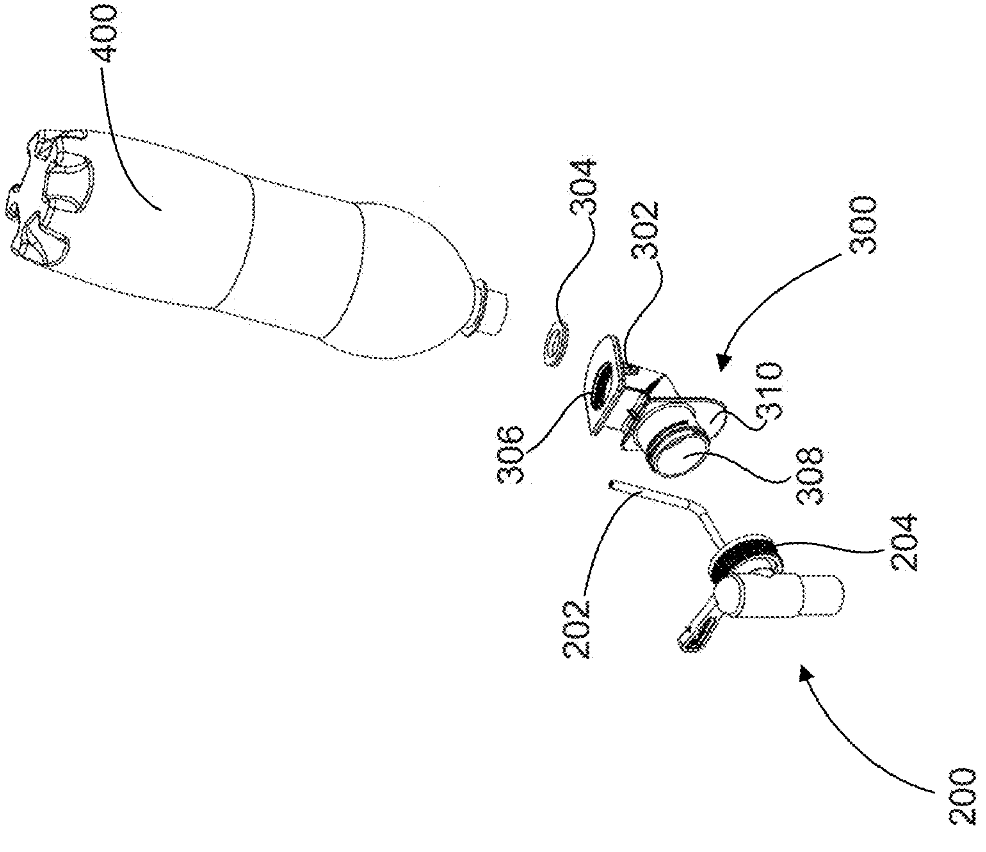
FIG. 3A shows an exploded assembly perspective view of an adaptor with self-tapping valve and beverage container according to an embodiment.

As shown in FIGS. 2 and 3A, for example, in some embodiments, each adaptor 300 includes an inlet portion 306 to be coupled to a beverage container 400, and an outlet portion 308 to be coupled to tap 200. In some embodiments, the inlet portion 306 and outlet portion 308 are angled with respect to each other such that the adaptor 300 is configured as a fluid elbow. Inlet portion 306 and outlet portion 308 may include a flange or other surface to interface with main body 100 and tap 200, respectively. In some embodiments, system 10 further includes seal 304, e.g., a bottle seal that may be configured between adaptor 300 and beverage container 400 to ensure a good seal and minimize leakage at the inlet portion when system 10 is in use. Seal 304 may be a silicone seal, or an o-ring, for example. Similarly, outlet portion 308 may also include a similar seal (not shown).

Turning to FIGS. 3A and 3B, in some embodiments, tap 200 includes coupling portion 204, to be connected to adaptor 300, for example at outlet portion 308. When tap 200, adaptor 300, and beverage container 400 are coupled together, the system is a closed system, avoiding pest ingress, and minimizing carbonation loss as the carbonation is not vented to atmosphere. In some embodiments, inlet portion 308 may be variable, such that it may be adjustable to fit various beverage container 400, for example different bottle openings, thread sizes, or the like. In some embodiments, inlet portion 308 may receive inserts, or include a flexible portion to account for variation in beverage container threads. In some embodiments, the adaptor 300 may be a quick-connect type fluid connection, or other suitable fluid tight seal.

As shown in FIGS. 3A and 3B, during use, an operator may couple beverage container 400 to adaptor 300, which may be coupled to tap 200. With tap 200 in a closed position, the entire assembly may be simply flipped and placed into cradle portion 102 of main body 100. Once resting within cradle portion 102, beverage within beverage container 400 may be dispensed through tap 200.

Figure 4:
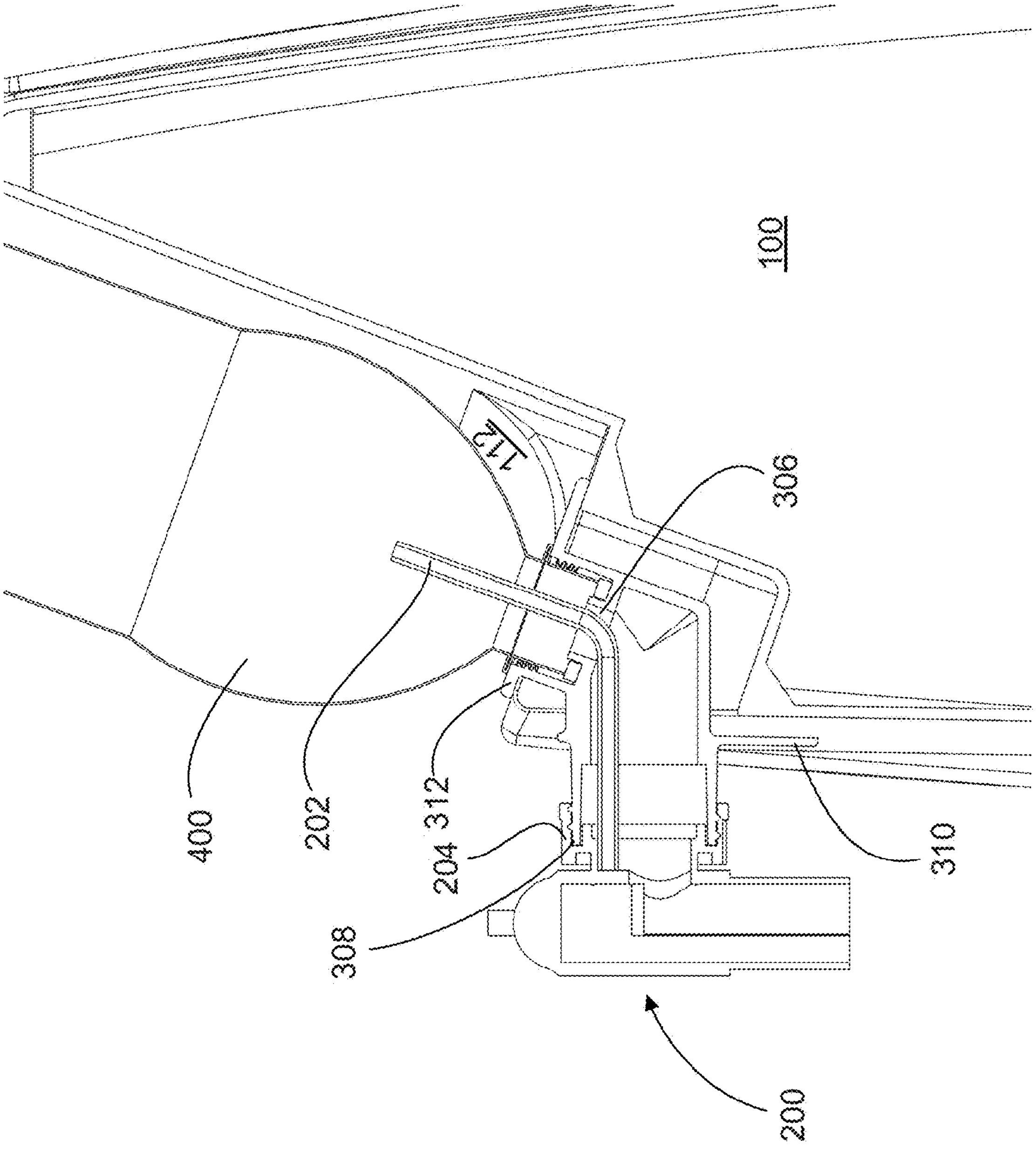
FIG. 4 shows an cross-sectional assembly perspective view of a the self-tapping valve, adaptor, beverage container, and main body as shown in FIG. 1.

As shown in FIGS. 3A, 3B, and 4, air tube 202 may be coupled to tap 200, which may be a standard tap. In some embodiments, the length of air tube 202 may be variable, or made from a plastic material which an operator may cut to size properly according to the size of beverage container 400. In some embodiments, tap 200 includes a split outlet that allows air to flow unhindered back into the bottle when the tap 200 is on, e.g., in use to pour a beverage. This relieves the air pressure inside the beverage container 400, e.g. bottle, so that a fast flow rate can be maintained even though the bottle is sealed to adaptor 300. Advantageously, the self-venting tap 200 makes the flow "glug-free", which reduces spillage when filling a cup or glass. In some embodiments, the vent is molded within tap 200. In this regard, there is no need for secondary venting in some embodiments. In some embodiments, tap 200 is made of food grade polyethylene with polypropylene (PP) spigots (or other food grade materials). In some embodiments, tap 200 is available as off the shelf/standard units, leading to serviceability in use.

As shown in the figures, adaptor 300 may couple tap 200 to beverage container 400. In some embodiments, tap 200 may include a different thread size or pattern as beverage container 400, and adaptor 300 may be used to couple the different thread sizes together. As shown in FIG. 4, for example, air tube 202 may extend through adaptor 300, and within beverage container 400. As shown, adaptor 300 may include inlet portion 306 and outlet portion 308, through which beverage and air tube 202 may pass. Adaptor 300 may include flanges 312, and 310, which may align to surfaces of main body 100. In some embodiments, flange 312 may engage surface of cradle portion 102, and flange 310 may engage a front surface of main body 100, further supporting the tap 200, adaptor 300, and beverage container 400 within main body 100.

Some embodiments are directed to a one-piece main body 100 for a beverage dispensing system 10, including a base portion 108, and a cradle portion 102 as described above. In some embodiments, cradle portion 102 extends upwardly at an angle, and includes cavity 114. In some embodiments, cavity 114 is configured to allow beverage container 400 to rest on a portion of cavity 114, as support. In some embodiments, cradle portion 102 further includes shoulder 112 disposed below cavity 114, which may be a curved surface to support a curved surface of beverage container 400, such as the top of a 1.25 liter through a 2.5 liter bottle of carbonated soft drink. Advantageously, shoulder 112 and cavity 114 may be sized such that they may receive a range of sizes and shapes of beverage containers 400. In some embodiments, shoulder 112 or cavity 114 may include a pad or coating, such that a beverage container 400 may be held securely within cradle portion 102 during dispensing. The configuration described optimizes the center of gravity balance and operational usage such that the system 10 is a stable table-top unit.

In some embodiments, the base portion 108 and cradle portion 108 may be formed integrally as a single piece such that a cavity is formed beneath the main body 100, such that multiple main bodies 100 may be stacked on top of one another. This advantageously reduces shipping complexity and cost, and is further environmentally friendly by reducing packaging waste. In some embodiments, the main body 100 includes a peripheral lip 110 around the distal end of the base portion 100 (e.g., around the inner cavity for stacking). In some embodiments peripheral lip 110 is configured to couple with a support pad 106, thereby closing the cavity beneath the main body. In some embodiments, the support pad may be a leveling support pad such that the main body may balance on relatively uneven surfaces. In some embodiments, the support pad 106 may not cover the interior stacking cavity, but instead just wrap around a portion of lip 110. In some embodiments, pad 106 may be locked to lip 110, for example with an interference fit, snap fit, adhesive, or the like.

Figure 7:
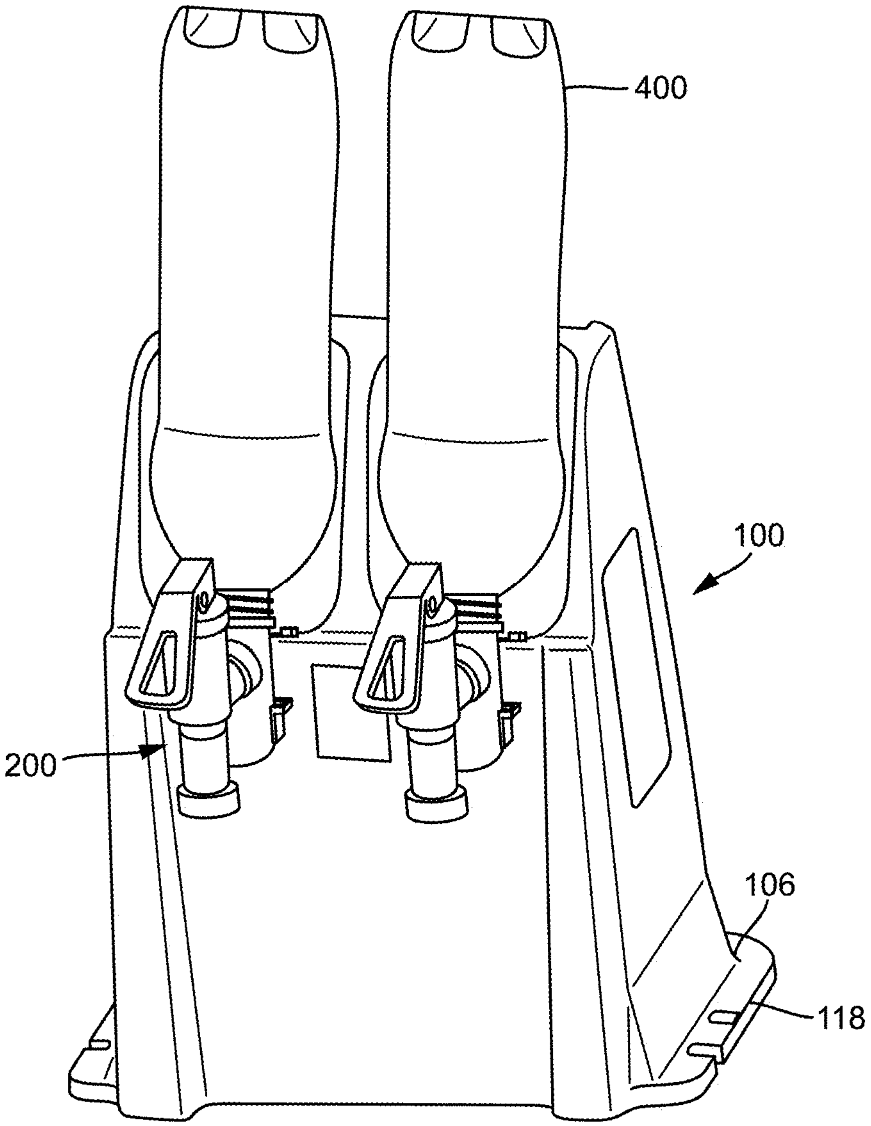
FIG. 7 shows a perspective view of a beverage dispensing system according to an embodiment.

In some embodiments, support pad 106 may further be configured to include a mounting flange 118 that extends perpendicular away from the outer surfaces of lip 110. As best shown in FIG. 7, mounting flange 118 may be configured to enable secure attachment of main body 100 to a surface, such as, for example, a table top. In some embodiments, mounting flange 118 may include one or more suction cups designed to releasably attach to a surface. In other embodiments, mounting flange 118 may include through holes and slots configured to accept fasteners, such as screws or bolts, that may be used to attach mounting flange 118 to a surface.

In some embodiments, the cradle portion 102 includes an engagement member such as slot 104 configured to engage a feature on adaptor 300 such as tab 302. In some embodiments, slot 104 may be positioned on adaptor 300 and tab 302 on cradle portion 102. In some embodiments, other engagement members may be used. In some embodiments, the main body 100 includes a branding surface positioned on the base portion.

Figure 5:
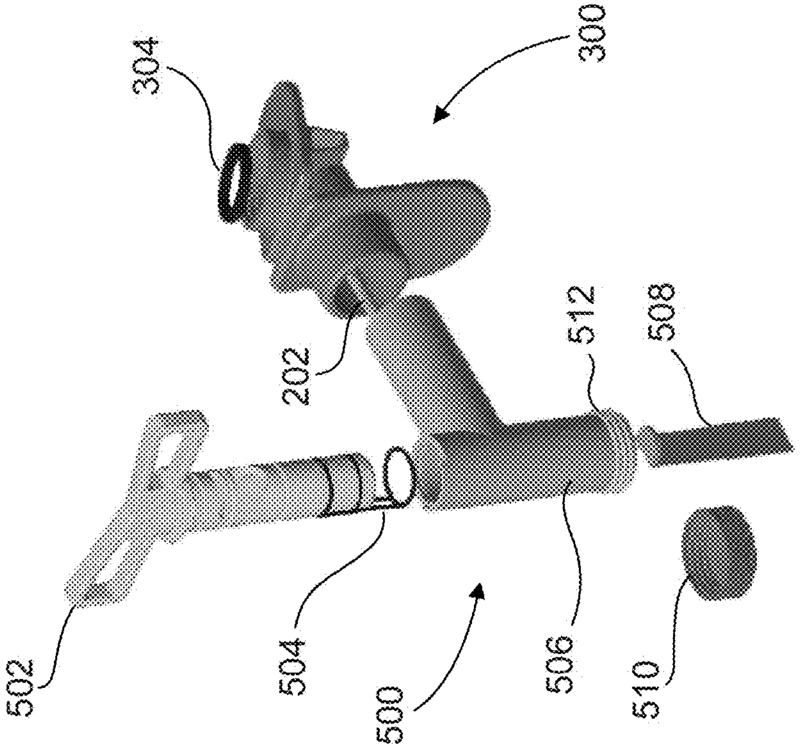
FIG. 5 shows an exploded assembly perspective view of an adaptor with self-tapping valve according to an embodiment.

In one embodiment, an alternate tap 500 couples to adaptor 300. As shown in FIG. 5, for example, tap 500 includes handle 502, having seal 504 coupled at a lower end, which may be inserted into body 506. As shown, seal 504 includes both horizontal and vertical sealing (e.g., with circumferential and vertical sealing elements), which improves isolation of the beverage and ambient air circulation, particularly in the case of carbonated beverage. Further, use of seal 504 having vertical and horizontal sealing decreases risk for beverage leaking at the end of tap 500. As shown in the figures, tap 500 may include separator 508, which is configured to separate the tap internal channels such that proper flow of both the beverage and ambient air may exist through the tap.

Further as shown in FIG. 5, cap 510 may be coupled to outlet 512 of tap 500, effectively closing the tap 500 to the outside ambient air. Cap 510 may be the cap of beverage container 400, which will be removed from beverage container 400 before dispensing. In this regard, if an operator or customer is not going to dispense a beverage for an extended time, it will minimize the carbonation loss over the extended time. In some embodiments, outlet 512 may be variable, such that it may be adjustable to fit various beverage container 400 caps 510, for example different bottle openings, thread sizes, or the like. In some embodiments, outlet 512 may receive inserts or external thread overlays, or include a flexible portion to account for variation in cap 510 threads.

Figure 6B:
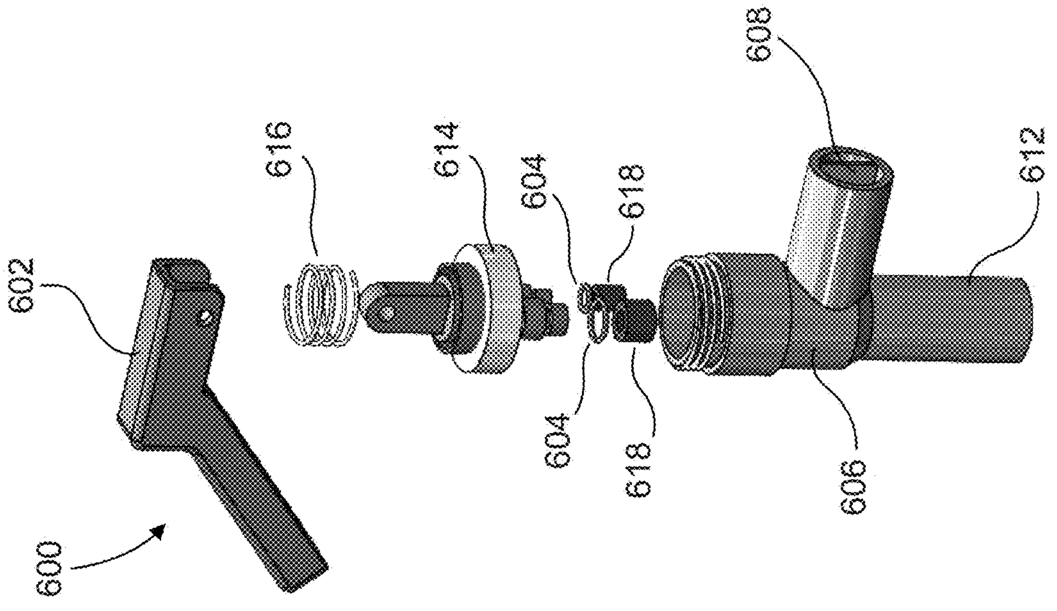
FIG. 6B shows an exploded assembly perspective view of the self-tapping valve shown in FIG. 6A.
Figure 6A:
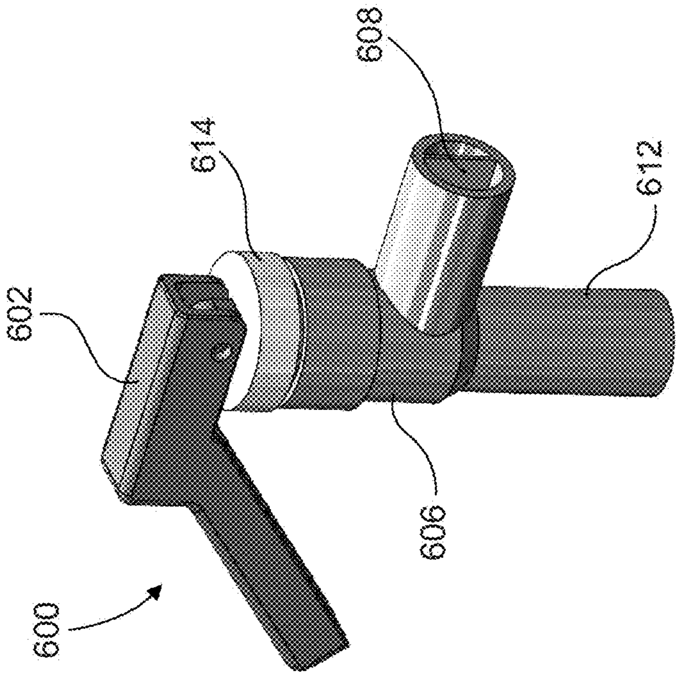
FIG. 6A shows a perspective view of a self-tapping valve according to an embodiment.

Turning to FIGS. 6A and 6B, an alternate tap 600 may couple to adaptor 300 as in previous embodiments. As shown, tap 600 includes handle 602, having seals 604 coupled at a lower end, which may be inserted into body 606. As shown, seals 604 includes seals for both the fluid channel and air channel as previously described, which improves isolation of the beverage and ambient air circulation, particularly in the case of carbonated beverage. Further, tap 600 may include spring 616 that biases block 614 downward such that valves 604 may biased against their seat within body 606. Use of spring 616 providing compressive forces onto the valve seat decreases risk for beverage leaking at the end of tap 600. As shown in the figures, tap 600 may include separator 608, which is configured to separate the tap internal channels such that proper flow of both the beverage and ambient air may exist through the tap. Similar as shown in FIG. 5, a cap may be coupled to the outlet 612 of tap 600, effectively closing the tap 600 to the outside ambient air.

Some embodiments are directed to a method for dispensing a beverage, including providing a beverage bottle, coupling the opening of the bottle to an adaptor, inverting the bottle and placing it in a cradle portion of a main body whereby the adaptor and cradle portion are coupled at an engagement portion, the cradle portion including an elongated cavity and a shoulder portion configured to receive the inverted bottle; and dispensing the beverage. In some embodiments, the method includes coupling the adaptor to a self-venting tap, coupling the self-venting tap to an air tube, and positioning the air-tube within the open beverage bottle such that a distal end of the tube is above a liquid level in the beverage bottle.

As discussed above, in some embodiments, the beverage container may be a single serve package and can be provided to the consumer from a store or restaurant attendant. In other embodiments, the cartridge may be dispensed to the consumer through a vending machine, or stored on a shelf. In some embodiments, the vending machine may be refrigerated and include an integrated point-of-sale ("POS") payment system that would dispense the cartridge requiring very little to no interaction from a store attendant.

In some embodiments, the system may be operated entirely by an attendant, rather than the consumer.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A method for dispensing a beverage, comprising:

providing an adaptor for a beverage bottle, the adaptor comprising an inlet portion to be coupled with the beverage container and an outlet portion removably coupled to a beverage tap, wherein the inlet portion and the outlet portion are angled with respect to each other such that the adaptor is configured as a fluid elbow;

providing a beverage dispenser main body with a base portion and a cradle portion, the cradle portion configured to support the beverage container in an inverted position;

coupling the beverage tap to an air tube;

coupling the opening of the beverage bottle to the inlet portion of the adaptor;

positioning the air-tube within the open beverage bottle such that a distal end of the tube is above a liquid level in the beverage bottle;

coupling a cap of the beverage bottle to the outlet of the beverage tap such that the beverage bottle is effectively sealed from the outside ambient environment;

inverting the beverage bottle and placing it in the cradle portion of a main body;

seating the adaptor into the cradle portion at an engagement portion of the cradle portion; and dispensing the beverage.

2. The method of claim 1, wherein the coupling of the adaptor occurs before the bottle is placed in the cradle portion.

3. The method of claim 1, wherein the cradle portion comprises an elongated cavity and a shoulder portion configured to receive the inverted bottle, and wherein placing the bottle in the cradle portion includes seating the bottle against the shoulder portion.

4. The method of claim 1, wherein seating the adaptor in the engagement portion further comprises engaging a tab disposed on the adaptor in a slot disposed in the engagement portion.

5. The method of claim 1, further comprising engaging a lock to prevent the adaptor from being removed after seating the adaptor in the engagement portion.

6. A method for dispensing a beverage, comprising:

providing an adaptor for a beverage bottle, the adaptor comprising an inlet portion to be coupled with the beverage container and an outlet portion removably coupled to a self-venting tap, wherein the inlet portion and the outlet portion are angled with respect to each other such that the adaptor is configured as a fluid elbow;

providing a beverage dispenser main body with a base portion and a cradle portion, the cradle portion configured to support the beverage container in an inverted position;

coupling the opening of the beverage bottle to the inlet portion of the adaptor, wherein the adaptor is coupled to the beverage bottle before the beverage bottle is loaded into the beverage dispenser main body;

inverting the beverage bottle and placing it in the cradle portion of a main body;

seating the adaptor into the cradle portion at an engagement portion of the cradle portion by sliding the adaptor into the engagement portion;

securing a tab disposed on the adaptor into a slot formed as a recess disposed in a surface of the engagement portion during the seating of the adaptor into the engagement portion by sliding the tab towards a bottom of the beverage dispenser main body into the slot; and dispensing the beverage.

7. The method of claim 6, further comprising:

coupling the self-venting tap to an air tube;

positioning the air-tube within the open beverage bottle such that a distal end of the tube is above a liquid level in the beverage bottle; and coupling a cap of the beverage bottle to the outlet of the self-venting tap such that the beverage bottle is effectively sealed from the outside ambient environment.

8. The method of claim 7, wherein the cradle portion comprises an elongated cavity and a shoulder portion configured to receive the inverted bottle, and wherein placing the bottle in the cradle portion includes seating the bottle against the shoulder portion.

9. The method of claim 6, further comprising engaging a lock to prevent the adaptor from being removed after seating the adaptor in the engagement portion.

* * * * *